B. F. SELLERS.
Barb-Winder.
No. 207,449. Patented Aug. 27, 1878.
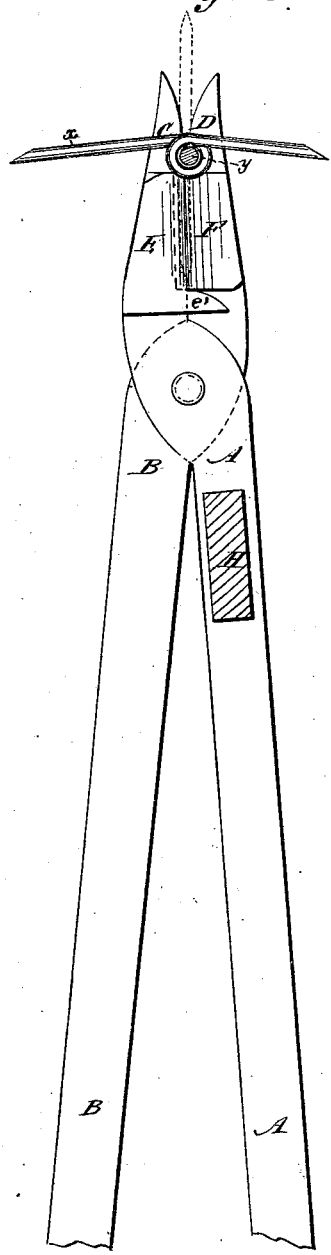
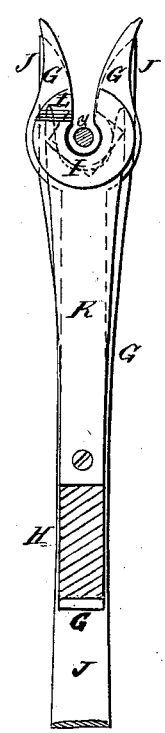
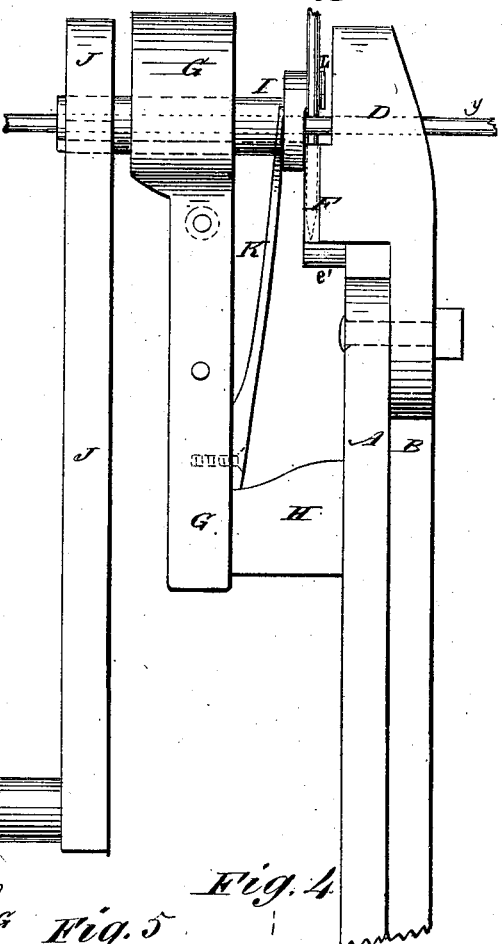
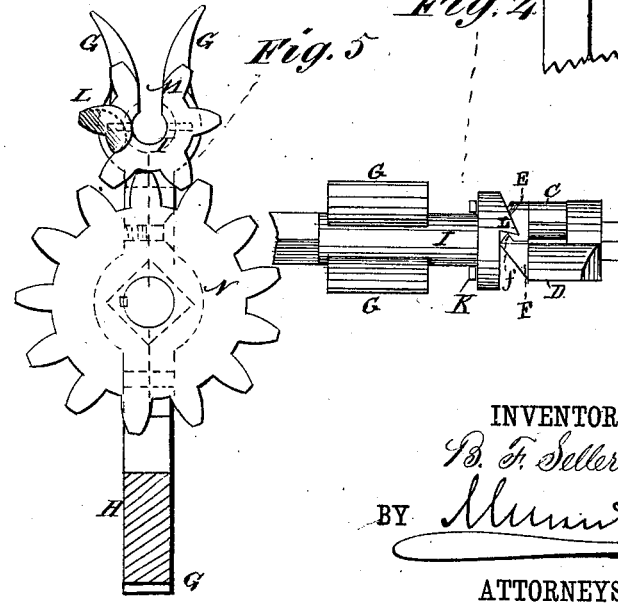

UNITED STATES PATENT OFFICE.

BENJAMIN F. SELLERS, OF GARDEN PRAIRIE, ILLINOIS.

IMPROVEMENT IN BARB-WINDERS.

Specification forming part of Letters Patent No. 207,449, dated August 27, 1878; application filed June 15, 1878.

To all whom it may concern:

Be it known that I, BENJAMIN F. SELLERS, of Garden Prairie, in the county of Boone and State of Illinois, have invented a new and useful Improvement in Barb-Winders, of which the following is a specification:

Figure 1 is a side view of my improved implement, showing the fence and barb-wires in position before the latter are coiled. Fig. 2 is a longitudinal section of the implement and a face view of the jaws for holding the fence and barb-wire. (The dotted lines in this figure represent the position of the barb-wire before being coiled or wound, and the full lines illustrate the finished barb, or the position of the barb after the tool has been removed.) Fig. 3 is a sectional view, showing more fully the forked bearing for the revolving coiling-mandrel. Fig. 4 is a top view of the part of the implement shown in Fig. 1. Fig. 5 is the same view as Fig. 3, but showing a modification.

Similar letters of reference indicate corresponding parts.

The present invention relates to certain improvements in that class of implements or devices which are used for coiling short pieces of wire around longitudinal fence-wires for forming wire barbs or guards.

The invention consists in the combination of a pair of double holding-jaws for retaining the fence and barb wires, a revolving spring-pressed mandrel or head, having a hooked coiling head and adapted to receive the fence-wire, a forked bar forming a bearing for the coiling-mandrel, and a forked handle or crank for rotating the coiling-mandrel, as will be hereinafter more fully described, and then pointed out in the claim.

A B are two handles, which are pivoted to each other in the manner of pliers, and which have jaws C D formed upon their forward ends. The faces of the jaws C D are rounded off or beveled to enable them to be readily applied to the fence-wires y, and have half-round notches formed in them to receive the said wires.

Upon the inner edges of the jaws C D are formed projections or side jaws E F, in one or both of which is formed a longitudinal groove, f, to receive and hold one end of the short wire x that is to be wound around the fence-wire. Upon the lower end of one of the side jaws E F is formed a toe, e', for the end of the barb-wire to rest upon while being inserted in the said jaws E F.

G is a short bar, the lower end of which is rigidly connected with the handle A by a short connecting-bar, H. The upper end of the bar G is forked to receive the fence-wire, and in the said end, at the bottom of the notch that forms the fork, is formed a bearing for the short shaft or mandrel I. The outer end of the shaft I is squared off to receive the crank J, by means of which the said shaft I is turned. The upper end of the crank J is notched to receive the fence-wire, and the shaft I has a longitudinal groove formed in it for the same purpose.

Upon the inner end of the shaft I is formed, or to it is attached, a shoulder or collar, against which rests the forked end of a spring, K, to hold the shaft I toward the jaws C D. The lower end of the spring K is attached to the lower part of the bar G.

The upper part of the bar G should be made of two pieces, bolted together, to enable the shaft I to be put into and taken out of its bearing when required.

Upon the inner end of the shaft I is formed a hook projection, L, to grasp the wire that projects from the side jaws E F of the jaws C D, and wind the said wire around the fence-wire as the shaft I is turned by the crank J.

The outer side of the jaw F is beveled or rounded, so that it may push the shaft I outward as the hook projection L strikes it to lay the coils of the barb-wire side by side, the inward pressure of the spring K causing the said coils to be laid close together. By this construction one coil of the barb-wire is laid for each revolution of the crank J.

If desired, a gear-wheel, M, may be formed upon the shaft I, into the teeth of which mesh the teeth of the gear-wheel N, pivoted to the bar G.

The gear N should have two or three times as many teeth as the gear-wheel M, so that a single turn of the crank J, which is attached to the journal of the said gear-wheel N, may lay two or three coils of the barb-wire.

Having thus described my invention, I claim as new and desire to secure by Letters Patent—

In an implement for applying barbs to fence-wires, the combination of the holding-jaws C D E F, the revolving mandrel or shaft I, having a hooked coiling-head, L, and provided with a slot or groove for the reception of the fence-wire, the spring K, the forked arm or bearing G, and the forked handle or crank J, all constructed and relatively arranged substantially as herein shown, for the purpose set forth.

BENJAMIN FRANKLIN SELLERS.

Witnesses:
    ISAAC RHODES,
    ALBERT BENTON.